US012712340B2

(12) United States Patent
Clark et al.

(10) Patent No.: US 12,712,340 B2
(45) Date of Patent: Aug. 18, 2026

(54) MODULAR POWER BOX

(71) Applicant: Digital Porpoise, LLC, Austin, TX (US)

(72) Inventors: Jason Wilfred Clark, Milford, NH (US); Steven William Dumas, Great Falls, VA (US)

(73) Assignee: Digital Porpoise, LLC, Austin, TX (US)

(*) Notice: Subject to any disclaimer, the term of this patent is extended or adjusted under 35 U.S.C. 154(b) by 218 days.

(21) Appl. No.: 18/357,889

(22) Filed: Jul. 24, 2023

(65) Prior Publication Data

US 2024/0213748 A1 Jun. 27, 2024

Related U.S. Application Data

(60) Provisional application No. 63/477,089, filed on Dec. 23, 2022.

(51) Int. Cl.
*H02B 1/48* (2006.01)
*H02G 3/08* (2006.01)

(52) U.S. Cl.
CPC ............... *H02B 1/48* (2013.01); *H02G 3/086* (2013.01)

(58) Field of Classification Search
CPC ...... H02B 1/48; H05K 5/0252; H05K 5/0256; H01R 13/447; H01R 13/465;
(Continued)

(56) References Cited

U.S. PATENT DOCUMENTS 5,064,386 A * 11/1991 Dale ...................... H01R 13/74 439/535
6,292,371 B1 * 9/2001 Toner, Jr. ............ H01R 25/006 361/752

(Continued)

FOREIGN PATENT DOCUMENTS

CN 204304225 U 4/2015
DE 19911196 9/2000

(Continued)

OTHER PUBLICATIONS

International Search Report and Written Opinion for PCT/US2023/085254, mailed Feb. 27, 2024, in 9 pages.

(Continued)

*Primary Examiner* — Robert J Hoffberg
(74) *Attorney, Agent, or Firm* — Knobbe Martens Olson and Bear, LLP

(57) ABSTRACT

A device may include a base box comprising a five-sided enclosure with a front mounting surface, wherein the base box further comprises an incoming feeder electrically connected to a branch circuiting infrastructure, a base box electrical connector, and a plurality of power interface module or blank cover plate mounting components. A device may include an interchangeable power interface module comprising an electrical connector, may have at least one circuit breaker, at least one receptacle, and a plurality of mounting holes or slots, which can mechanically engage with the base box, thus forming an electrical connection between the incoming feeder electrically connected to the branch circuiting infrastructure and the at least one receptacle of the interchangeable power interface module. A device may include a blank cover plate having a surface with upper and lower lips for mounting and de-mounting on the base box, and a plurality of mounting holes or slots.

37 Claims, 15 Drawing Sheets

(58) Field of Classification Search
CPC .... H01R 13/514; H01H 1/5866; H02G 3/086; H02G 3/14; H02G 3/16
See application file for complete search history.

(56) References Cited

U.S. PATENT DOCUMENTS

| | | | | |
|---|---|---|---|---|
| 6,870,099 | B1 * | 3/2005 | Schultz | H02G 3/14 174/53 |
| 6,939,179 | B1 * | 9/2005 | Kieffer, Jr. | H01R 13/514 439/724 |
| 6,945,815 | B1 * | 9/2005 | Mullally | H01R 13/6215 439/535 |
| 7,425,677 | B2 * | 9/2008 | Gates | H01R 12/675 174/59 |
| 7,467,888 | B2 * | 12/2008 | Fiene | H01R 31/065 439/651 |
| 7,497,273 | B2 * | 3/2009 | Schoettle | H01R 13/665 439/535 |
| 7,542,268 | B2 | 6/2009 | Johnson, Jr. | |
| 8,341,837 | B2 | 1/2013 | Braunstein et al. | |
| 8,637,176 | B2 * | 1/2014 | Wurth | H01M 50/50 320/105 |
| 8,882,536 | B2 | 11/2014 | Utz | |
| 9,219,358 | B2 * | 12/2015 | Elberbaum | G05B 15/02 |
| 9,564,725 | B1 * | 2/2017 | Moss | H01R 25/161 |
| 9,653,860 | B2 * | 5/2017 | Hestrin | H01R 25/006 |
| 9,733,682 | B2 | 8/2017 | Butzer et al. | |
| 9,991,682 | B2 | 6/2018 | Wickett et al. | |
| 10,225,005 | B1 * | 3/2019 | Elberbaum | H02G 3/14 |
| 10,313,141 | B1 * | 6/2019 | Elberbaum | H04B 10/2589 |
| 10,317,972 | B2 | 6/2019 | Jen et al. | |
| 10,531,587 | B2 | 1/2020 | Compton et al. | |
| 10,686,535 | B2 * | 6/2020 | Elberbaum | H04L 67/12 |
| 10,720,764 | B2 * | 7/2020 | Misener | H01R 13/665 |
| 11,005,247 | B1 * | 5/2021 | Booyse | H02G 3/12 |
| 11,527,876 | B2 * | 12/2022 | Fernandez | H01R 31/06 |
| 2009/0235515 | A1 * | 9/2009 | Schoettle | H01R 13/73 29/428 |
| 2011/0148213 | A1 | 6/2011 | Baldwin et al. | |
| 2015/0000972 | A1 * | 1/2015 | Mayer | H02G 3/16 174/560 |
| 2021/0251101 | A1 | 8/2021 | Sheehan et al. | |
| 2022/0200250 | A1 | 6/2022 | Brooks et al. | |
| 2022/0285899 | A1 * | 9/2022 | Ettel | H01R 13/516 |
| 2025/0055269 | A1 * | 2/2025 | Maddox | H02G 3/16 |

FOREIGN PATENT DOCUMENTS

| | | | | |
|---|---|---|---|---|
| GB | 2255694 A | * | 11/1992 | H04M 1/0293 |
| WO | WO 2024/137885 | | 6/2024 | |

OTHER PUBLICATIONS

International Report on Patentability for PCT/US2023/085254, issued Jun. 24, 2025, in 5 pages.

* cited by examiner

Receptacle Box
102
Power Whip
Remote Power Panel
30 AMP
200
200
N
L2 L3
201

MODULAR POWER BOX

REFERENCE TO RELATED APPLICATIONS

This application claims the benefit of U.S. Provisional Application No. 63/477,089 filed Dec. 23, 2022, the entire disclosure of which is hereby incorporated by reference herein in its entirety.

BACKGROUND OF DISCLOSURE

Field of Disclosure

Aspects of the present disclosure relate generally to the power distribution systems of data centers, and, in certain embodiments, a modular power box which can be used in the power distribution systems of data centers.

Background

A data center houses a plurality of computers or servers, and as such there is a frequent need to add and modify power connections (which may also be referred to as "receptacles") to equipment. Devices for supplying, distributing, and managing the power consumption needs of data centers thus are in high demand. Remote Power Panels (RPPs) are often times used to route branch circuit power to the various types of information technology equipment or information technology cabinets collectively referred to as ITE moving forward.

SUMMARY OF DISCLOSURE

An aspect of the present disclosure is the recognition that installing the electrical branch circuitry linking from the RPP to each piece of ITE can be complicated as the variance between the use cases is considerable. An RPP acts as the final power distribution point prior to the individual receptacles located at a specific ITE. Within RPPs, breakers could be utilized as over-current protection devices. An RPP can be shared between multiple ITEs or be dedicated to an individual ITE. Currently, this installation process is time consuming and can significantly delay the start-of-use time for a data center. As such, a system which could make generic the installation process for installing and modifying branch circuit power would result in significant cost and time savings. Embodiments of the present disclosure are directed to providing a power management system with modular power boxes which can be easily modified by the end user once the particular use case for each modular power box has been determined. By utilizing the disclosed modular power boxes, electrical power can be distributed from an RPP in a way that would allow for easier customization of the IT equipment power connections once the use case is determined by the end-user, or to meet changing electrical requirements. The modular power boxes can be connected to the electrical system through the use of flexible branch circuit power whips, or other methods.

The ITE could have one or a multitude of power connections assigned to it from which the ITE could draw power. Having a multitude of power connections assigned to an ITE could allow for backup power to be available in the event that the primary circuit is shut off for maintenance or other purposes. A multitude of power connections assigned to an ITE could also be beneficial for where an ITE requires multiple power connections to connect to the electrical branch circuitry.

The modular power boxes can be permanently connected to the RPPs through the use of feeder connections or the like into a base box of the modular power box fitted for the worst-case branch circuiting needs, for example, 3 phase 60 amps (3P-60 Amps).

In some aspects, the techniques described herein relate to a modular power box including: a base box including a five-sided enclosure with a front mounting surface, wherein the base box further includes an incoming feeder electrically connected to a branch circuiting infrastructure, an electrical connectors support bracket, a base box electrical connector, and a plurality of interchangeable power interface modules or a blank colver plate mounting component. An interchangeable power interface module includes a mounting surface with upper and lower protrusions for mounting and de-mounting on the base box, an electrical connectors support bracket, a cover plate electrical connector, it may include one or two circuit breakers, at least one receptacle, and a plurality of mounting holes or slots. The blank cover plate having a flat metal surface with upper and lower lips for mounting and de-mounting on the base box, and a plurality of mounting holes or slots, wherein when the plurality of power interface module or blank cover plate mounting components engage with the plurality of mounting holes or slots on the interchangeable power interface module, an electrical connection is formed between the incoming feeder electrically connected to the branch circuiting infrastructure and the at least one receptacle of the interchangeable power interface module.

In some aspects, the techniques described herein relate to a modular power box, wherein the interchangeable power interface module includes a singular circuit breaker and a singular receptacle.

In some aspects, the techniques described herein relate to a modular power box, wherein the interchangeable power interface module includes two circuit breakers and two receptacles.

In some aspects, the techniques described herein relate to a modular power box, wherein the interchangeable power interface module is configured to provide 3 phase 60 Amp power to a single receptacle where no branch breakers are provided In some aspects, the techniques described herein relate to a modular power box, wherein the interchangeable power interface module is configured to provide single phase 30 Amp power to two receptacles.

In some aspects, the techniques described herein relate to a modular power box, wherein the blank cover plate includes no circuit breakers or receptacles or electrical connectors.

In some aspects, the techniques described herein relate to a modular power box, wherein the interchangeable power interface module and the blank cover plate further include a circuit ID opening and the base box further includes a circuit ID label, wherein the circuit ID label is visible through the circuit ID opening when the interchangeable power interface module or blank cover plate is connected to the base box.

In some aspects, the techniques described herein relate to a method for installing a modular power box, the method including: mechanically coupling a base box to a structural support, electrically coupling the base box to an electrical branch circuiting infrastructure through a branch circuit breaker electrically coupled to an RPP, aligning a chosen power interface module or blank cover plate with a plurality of mounting components on a front mounting surface of the base box, and engaging the chosen power interface module or blank cover plate onto the plurality of mounting components on the front mounting surface of the base box.

In some aspects, the techniques described herein relate to a method, wherein a power interface module is chosen, the method further including when a plurality of mounting holes or slots of the power interface module is engaged with the plurality of mounting components on the front mounting surface of the base box, an electrical connection is formed between an electrical connectors component of the base box and an electrical connectors component of the power interface module such that at least one receptacle of the power interface module receives power from the base box.

In some aspects, the techniques described herein relate to a method, wherein the power interface module includes a singular circuit breaker and a singular receptacle on the power interface module.

In some aspects, the techniques described herein relate to a method, wherein the power interface module is configured to provide 3 phase 60 Amp power to a singular receptacle on the power interface module.

In some aspects, the techniques described herein relate to a method, wherein the power interface module is configured to provide 3 phase 30 Amp power to two receptacles on the power interface module.

In some aspects, the techniques described herein relate to a method, wherein the power interface module is configured to provide single phase 30 Amp power to two receptacles on the power interface module.

In some aspects, the techniques described herein relate to a method, wherein a blank cover plate is chosen with no cover plate circuit breakers or receptacles or electrical connectors.

In some aspects, the techniques described herein relate to a method, wherein a circuit ID label on an electrical connectors component of the base box is visible through a circuit ID opening of the chosen power interface module or blank cover plate.

In some aspects, the techniques described herein relate to a method of re-configuring (or modifying) an installed modular power system, the method including: mechanically detaching a first interchangeable power interface module or blank cover plate from a front mounting surface of a base box, selecting a second interchangeable power interface module or blank cover plate, aligning the second interchangeable power interface module or blank cover plate with a plurality of mounting components on the front mounting surface of the base box, placing the second interchangeable power interface module or blank cover plate onto the plurality of mounting components on the front mounting surface of the base box, and engaging the second interchangeable power interface module or blank cover plate onto the plurality of mounting components on the front mounting surface of the base box.

In some aspects, the techniques described herein relate to a method, wherein the second interchangeable power interface module or blank cover plate includes a singular circuit breaker and a singular receptacle.

In some aspects, the techniques described herein relate to a method, wherein the second interchangeable power interface module is configured to provide 3 phase 60 Amp power to a receptacle on the second interchangeable power interface module.

In some aspects, the techniques described herein relate to a method, wherein the second interchangeable power interface module is configured to provide single phase 30 Amp power to two circuit breakers and two receptacles on the second interchangeable power interface module.

In some aspects, the techniques described herein relate to a method, wherein the second interchangeable power interface module or blank cover plate is a blank cover plate which includes no circuit breakers or receptacles or electrical components.

In some aspects, the techniques described herein relate to a modular power box including: a base box including a five-sided enclosure with a front mounting surface, wherein the base box further includes a backplane and an electrical connectors support bracket, a base box electrical connector, and a plurality of power interface module or blank cover plate mounting components. An interchangeable power interface module includes a mounting surface with upper and lower protrusions for mounting and de-mounting on the base box, an electrical connectors support bracket, a cover plate electrical connector, including one or two circuit breakers, at least one receptacle, and a plurality of mounting holes or slots. The blank cover plate has a flat metal surface with upper and lower lips for mounting and de-mounting on the base box, and a plurality of mounting holes or slots, wherein when the plurality of power interface module or blank cover plate mounting components engage with the plurality of mounting holes or slots on the interchangeable power interface module, an electrical connection is formed between an electrical branch circuiting infrastructure of the base box and the at least one receptacle of the interchangeable power interface module.

In some aspects, the techniques described herein relate to a modular power box, wherein the interchangeable power interface module includes a singular circuit breaker and a singular receptacle.

In some aspects, the techniques described herein relate to a modular power box, wherein the interchangeable power interface module includes two circuit breakers and two receptacles.

In some aspects, the techniques described herein relate to a modular power box, wherein the interchangeable power interface module is configured to provide 3 phase 60 Amp power to a single receptacle.

In some aspects, the techniques described herein relate to a modular power box, wherein the interchangeable power interface module is configured to provide single phase 30 Amp power to two receptacles with no circuit breakers In some aspects, the techniques described herein relate to a modular power box, wherein the blank cover plate includes no circuit breakers or receptacles.

In some aspects, the techniques described herein relate to a modular power box wherein the interchangeable power interface module and the blank cover plate further include a circuit ID opening and base box further includes a circuit ID label, wherein the circuit ID label is visible through the circuit ID opening when the interchangeable power interface module or blank cover plate is connected to the base box.

DETAILED DESCRIPTION OF THE PREFERRED EMBODIMENTS

Figure 1A:
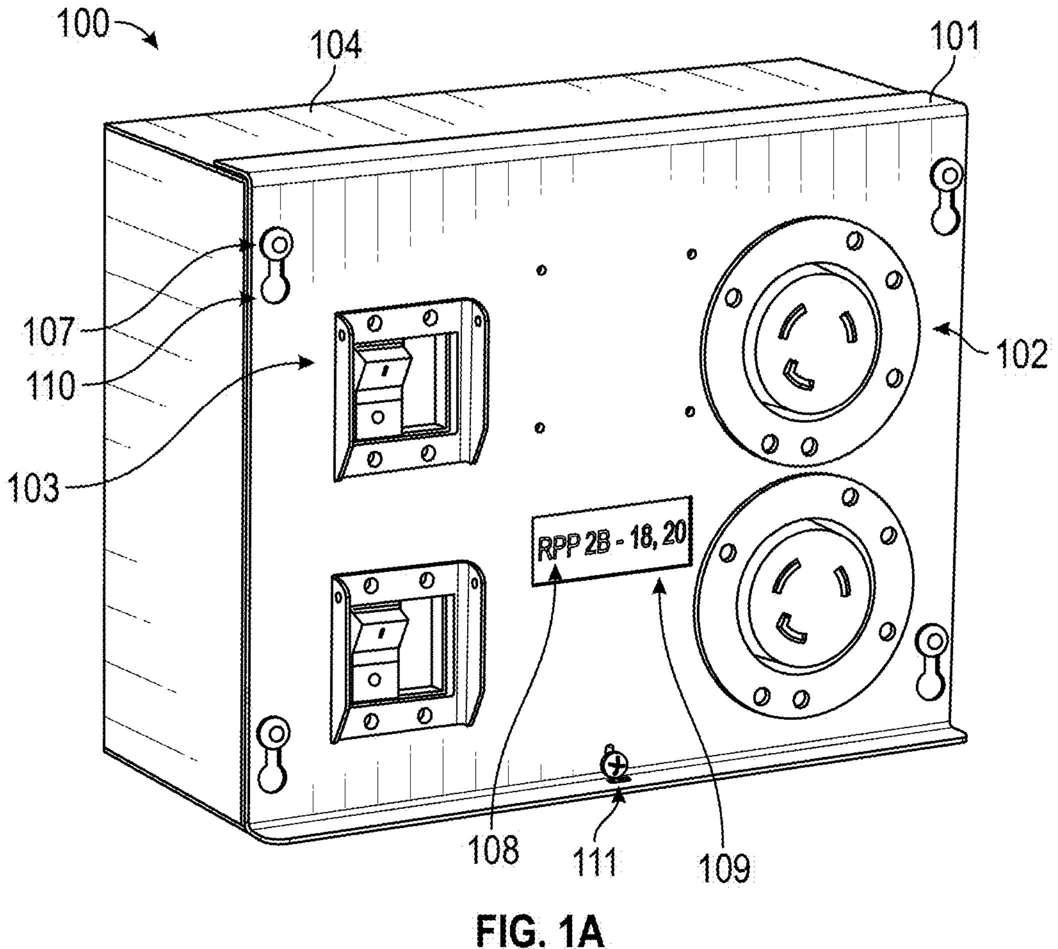
FIG. 1A is a front isometric view of a modular power box with a Power Interface Module (PIM) configured for multiple output receptacles, with associated circuit breakers with guards, the PIM being mechanically and electrically attached to a base box as an embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

In accordance with one feature of this disclosure, an easily modifiable power box for a power delivery system which can be used as a replacement for typical branch circuits and receptacles is disclosed. The modular power box includes a permanently installed base box electrically connected to an incoming electrical connection (i.e., an electrical feeder, incoming feeder) which can be electrically connected to the upstream RPP. The modular power box could further include one of a multitude of embodiments of interchangeable PIMs (i.e., an interchangeable power interface module) or blank cover plates, the choice between which would be determined by the desired use-case.

Advantageously, the installation of the modular power boxes at each ITE can be performed before the use-case and power requirements are determined, due to the modular nature of the system. This allows for a more streamlined installation process to reduce potential down-time when establishing electrical connections for a newly constructed server room. This flexibility also reduces costs associated with labor of electrical contractors or the like which would traditionally be required for customization of electrical requirements. This also allows for later-date modification of the power requirements to take place without needing to modify the branch circuiting anywhere other than at the PIM, as the modular nature of the disclosed power system allows for casy reconfiguration as a customer's power requirements change over time by merely replacing the currently installed PIM with one which has an electrical configuration matching that which is required by the client for that ITE.

Furthermore, data centers frequently accommodate more than one customer. Differing customers may have differing power requirements. As such, having a modular power box is additionally advantageous as the needs of multiple different customers can be accommodated simultaneously, or over the course of populating the entire data center, with no interruption to the power delivery to other customers. Current traditional methods of power distribution require that the power demands at each of the ITE locations are known during the initial installation of the branch circuits and receptacles. Alternatives to the present disclosure include branch circuits and receptacles connected to RPPs, or branch circuits and receptacles connected to busways both of which require interruption and/or risk to other customers during circuiting modifications.

Furthermore, the installation of modular power boxes rather than branch circuits to RPPs or busways advantageously provides safer working conditions for personnel. To avoid electrical shock and arc flash hazards while adding or modifying branch circuiting and receptacles fed from an RPP or busway, the power would need to be shut off to the entire RPP or busway. The present disclosure allows for the safe addition or modification of receptacles by shutting off the dedicated upstream circuit breaker without the need to shut down the entire RPP or busway. Once the dedicated breaker is shut off, the PIM can be added or replaced eliminating electrical safety concerns and risk to other customers.

Advantageously, due to the modular nature of the PIMs and the base boxes, the modular power box itself does not need to have power monitoring equipment as the upstream RPP may have a power monitoring system that can be configured on day 1 to accommodate any configuration of PIM inclusive of individual receptacle monitoring of single receptacle or multiple receptacle configurations.

In accordance with another feature in this disclosure, a method of installing the modular power box is performed by mechanically attaching the base box to the adjacent structural support system of the power box's associated ITE, electrically attaching the base box to the upstream RPP, and attaching a selected embodiment of the modular power box's PIM or blank cover plate to the base box. Advantageously, this process can be performed before the specific power requirements of the ITE are known. This design can allow for branch circuiting to be configured without the need for an electrical contractor or the like to be available once the circuiting requirements at a particular ITE are established. Furthermore, this process advantageously does not expose technicians to arc flash or shock hazard safety concerns when installing or removing the PIMs, as the upstream branch breaker will be turned off during the installation or removal. The power is not restored until the PIM is fully engaged onto the base box, at which point the mounting screws have all been secured.

In accordance with another feature of certain embodiments of the disclosure, a method of configuring and installing a selected embodiment of the modular power box's PIM or a blank cover plate is performed by removing the presently installed PIM or blank cover plate and replacing it with a PIM matching the ITE circuiting requirements or a blank cover plate. As discussed herein, this process advantageously allows for an easier customization of the power needs of each ITE compared to traditional methods which require that the power requirements for cach branch circuit and receptacle be determined during the initial installation of the RPP to avoid electrical hazards associated with branch circuiting work or the requirement to de-energize the entire RPP.

FIG. 1A illustrates an embodiment of the disclosed modular power box which can be used in lieu of a typical branch circuit and receptacle by utilizing various interchangeable modules to customize the modular power box to be more suited to its use case within the branch circuiting infrastructure. The modular power box 100 can comprise a PIM 101 configured with one or more output receptacles 102 to which the ITE can electrically connect, and a base box 104 which can engage with said PIM 101. The PIM 101 displayed in this embodiment is outfitted with associated circuit breakers 103 which are electrically in line with the upstream RPP. In some embodiments, a PIM 101 may have no circuit breakers 103 installed. The PIM 101 is mechanically attached to a base box 104 by aligning the plurality of PIM mounting components 107 arranged on a front mounting surface of the base box 104 with their associated mounting slots or zones 110 on the PIM (or blank cover plate). In some embodiments, the components of the PIM 101 are mounted onto a flat metal mounting surface with upper and lower lips for mounting and de-mounting on the base box. Completing the installation of the PIM 101 to the base box 104 creates an electrical connection between the RPP and the output receptacles 102. The output receptacles 102 can be one of several possible embodiments, including but not limited to standardized connectors such as an IEC C13 connector, an IEC C19 connector, or other electrical connectors which would be beneficial as desired or required known by a person having skill in the art. A circuit ID label 108 can be present on the electrical connections (shown in FIG. 3) in the base box 104, and can be visible through a circuit ID opening 109 of the PIM 101. In some embodiments, the plurality of PIM mounting components 107 can be configured to be non-fixedly attached, connected, or coupled to the base box 104 (i.e., to threading in/through the base box 104) to a plurality of PIM mounting connectors 107' (shown in FIG. 1C and FIG. 1D) such that the plurality of PIM mounting components 107 could be removed from the base box 104. This could be accomplished by having the plurality of PIM mounting components 107 mechanically engage with the plurality of PIM mounting connectors 107'. This can be accomplished by threading, by press-fitting, or by other ways known by one skilled in the art, as desired or required. The circuit ID opening 109 can allow for casy display of identifying information regarding which branch circuit is terminating at the modular power box, which can be advantageous during energization, de-energization, and troubleshooting. The PIM 101 could additionally be configured to be secured to the modular power box 100 by a mounting component 111 which non-fixedly attaches the PIM 101 by passing through a mounting component slot 112 (shown in FIG. 2) in the PIM 101 to mechanically engage with a mounting component connector 113 (shown in FIG. 3) on the base box 104. The mounting component 111 could be configured to be threaded such that the PIM 101 is removable after the PIM 101 is attached to the modular power box 100 by the mounting component 111.

Figure 2:
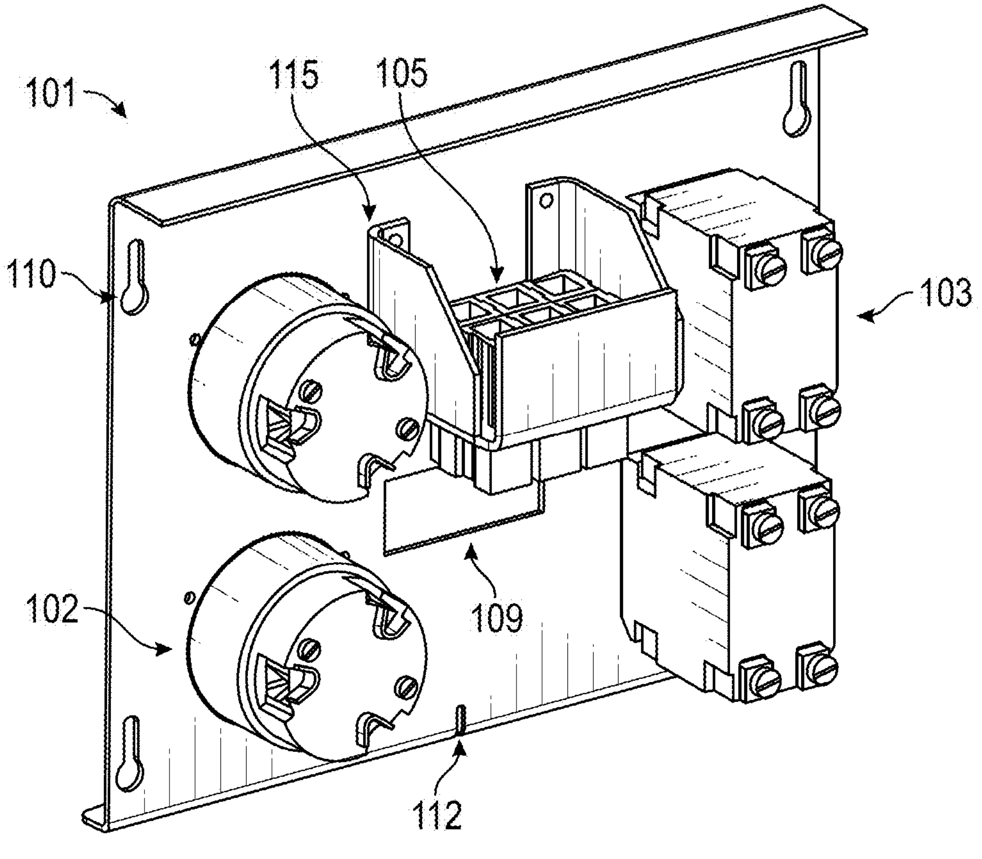
FIG. 2 is a back isometric view of an embodiment of a PIM configured with multiple output receptables, with associated circuit breakers mechanically and electrically attached to a base box as an embodiment of the present disclosure. (Note: electrical wiring and base box is not shown for clarity.).

FIG. 2 is a back isometric view of the embodiment of the PIM 101 of FIG. 1A configured with the multiple output receptables 102 and associated circuit breakers 103, which have guards on the outside surface of the PIM (shown in FIG. 1A) to prevent accidental toggling of the circuit breakers. Electrical connections make the various components displayed in this and other PIMs but are not displayed in Figures to increase readability. This PIM 101 is a flat mounting surface with upper and lower protrusions or lips for mounting and de-mounting from the base box 104, fitted with two output receptacles 102 into which electrical equipment can be connected to draw power. In some embodiments, the PIM 101 can be a flat metal surface with or without upper and lower protrusions or lips. The two output receptacles 102 are electrically connected to their respective two circuit breakers 103. The PIM 101 makes electrical connection with the base box 104 of the modular power box (shown in FIG. 1A) through the electrical connectors component 106 (shown in FIG. 3) located on the base box 104 and the electrical connectors component 105 located on the PIM 101. The electrical connectors component 105 can be connected to the PIM 101 using electrical connector support brackets 115. The electrical connectors component 105 can be connected to the PIM 101 by various other means known by one skilled in the art (i.e., gluing, welding, sintering, tying, etc.), as desired or required. The electrical connectors component 106 of the base box 104 (shown in FIG. 3) and electrical connectors component 105 of the PIM 101 can be connectors designed to prevent accidental contact with personnel or unintended components of the modular power box while the electrical connection between the base box 104 and PIM 101 is not yet made. In a non-limiting example, the electrical connectors component 106 of the base box 104 and electrical connectors component 105 of the PIM 101 are Anderson brand connectors. Utilizing electrical connectors designed to prevent accidental contact with personnel or unintended components of the modular power box while the electrical connection between the base box 104 and PIM 101 is not yet made can prevent accidental discharge of electricity during the installation process for the base box 104, prevent damage to the RPP, or other benefits appreciated by one skilled in the art. Upon completion of an appropriate method of installation for the PIM 101 (one example demonstrated in FIGS. 4A-4C herein), an electrical connection (or coupling) is formed between the RPP and the PIM 101: through the RPP branch circuit breaker, the branch circuit wiring, the electrical connectors 105 and 106, the circuit breakers 103, and the output receptacles 102. In some embodiments, the PIM 101 further comprises a plurality of PIM mounting zones 110 positioned such that upon completion of installation of the PIM, the plurality of mounting zones 110 can be mechanically engaged with the plurality of PIM mounting components 107 of the base box 104. In some variants, the plate of the PIM 101 is slightly angled relative to mounting surface on the modular power box 100 once installed. Angling the plate of a PIM 101 or blank cover plate 114 relative to the mounting surface of a base box 104 can relieve pressure from an electrical connector support bracket 115, the plurality of PIM mounting components 107, and the mounting component connector 113.

In the embodiment illustrated in FIG. 1A, the plurality of PIM mounting components 107 are screws with their distal ends having a head with a wider radius than their shaft. The plurality of PIM mounting zones 110 in this embodiment would comprise mounting holes or slots for each corresponding mounting component 107 wherein the slot has a wider portion which can accommodate the head of the PIM mounting component 107 and a narrower portion which cannot accommodate the head of the PIM mounting component 107, located in such a way that when the electrical connectors component 106 of the base box 104 and associated electrical connectors component 105 of the PIM 101 electrically connect, the narrower portion, or guide slots, of the plurality of PIM mounting zones 110 can be engaged with the corresponding heads of the PIM mounting components 107, preventing the PIM 101 from being able to pivot away from the base box 104, increasing the security of the electrical connection.

Figure 1B:
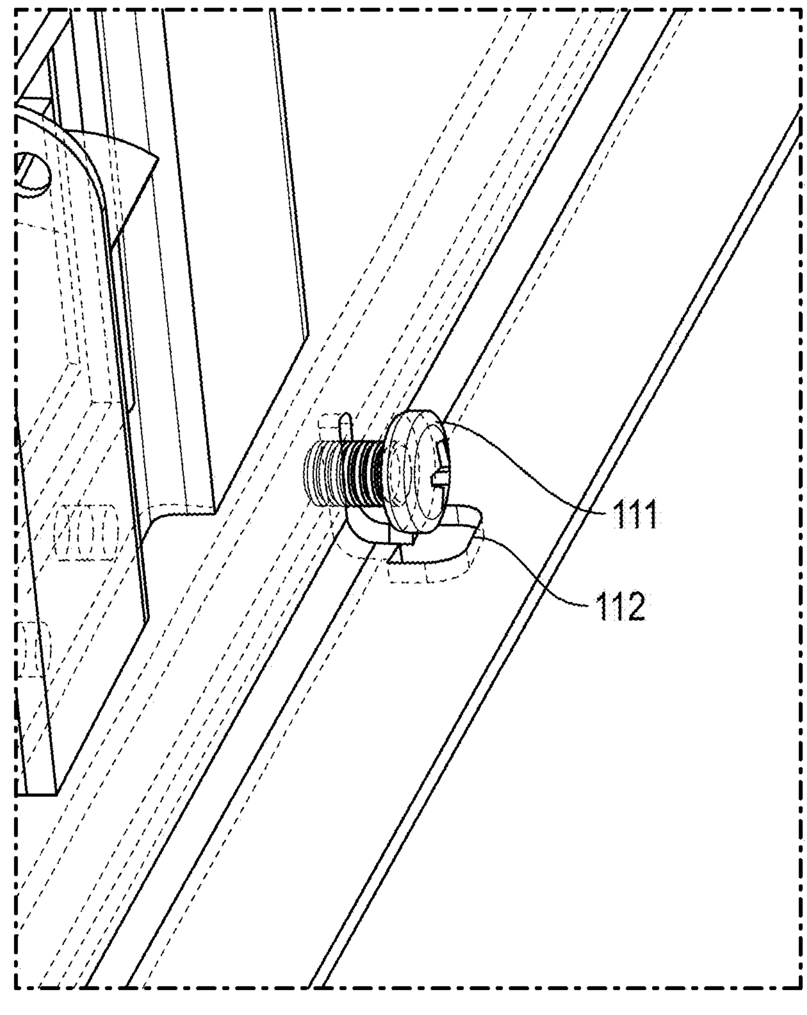
FIG. 1B is a focused view of a mounting component and mounting component slot positioned on the PIM for the modular power box of FIG. 1A.
Figure 1C:
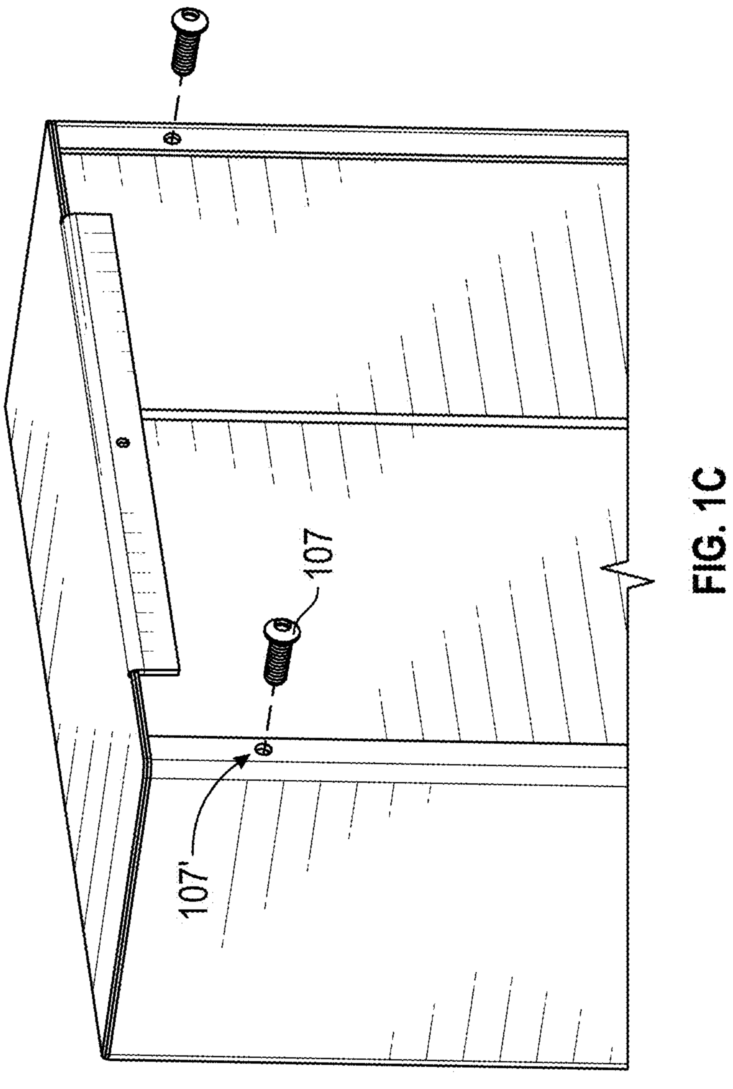
FIG. 1C is a front isometric view of a modular power box showing an interaction between a PIM mounting component and a PIM mounting connector.
Figure 1D:
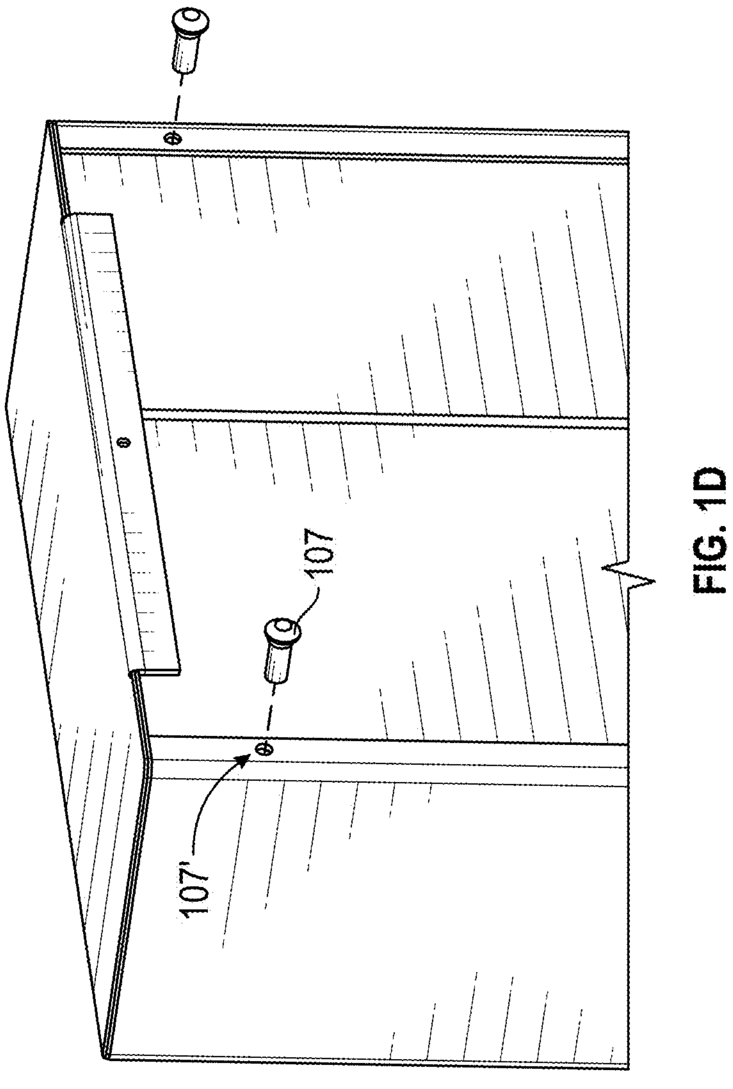
FIG. 1D is a front isometric view of a modular power box showing an interaction between another embodiment of a PIM mounting component and a PIM mounting connector.
Figure 5:
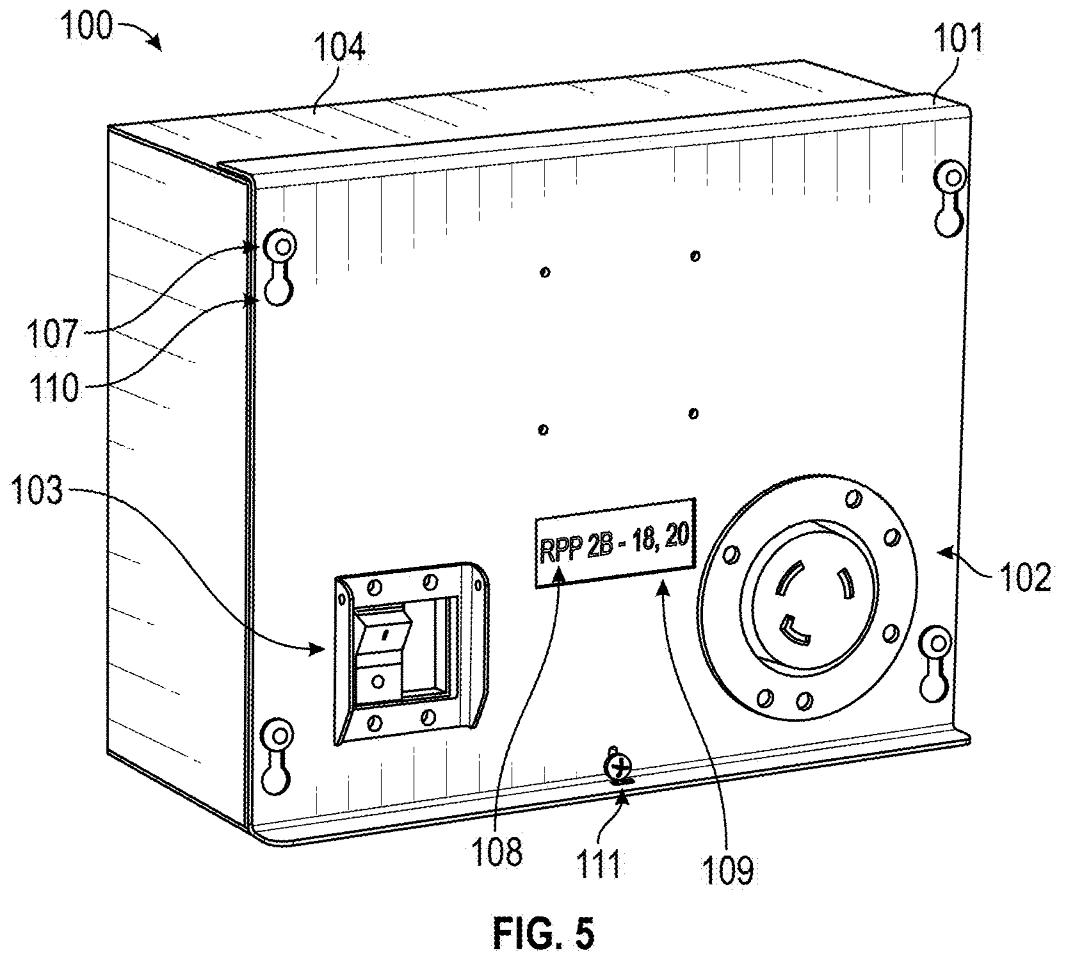
FIG. 5 is a front isometric view of an alternative embodiment of a modular power box with a PIM configured for a singular output receptacle, with an associated circuit breaker with a guard, mechanically and electrically attached to a base box.
Figure 6:
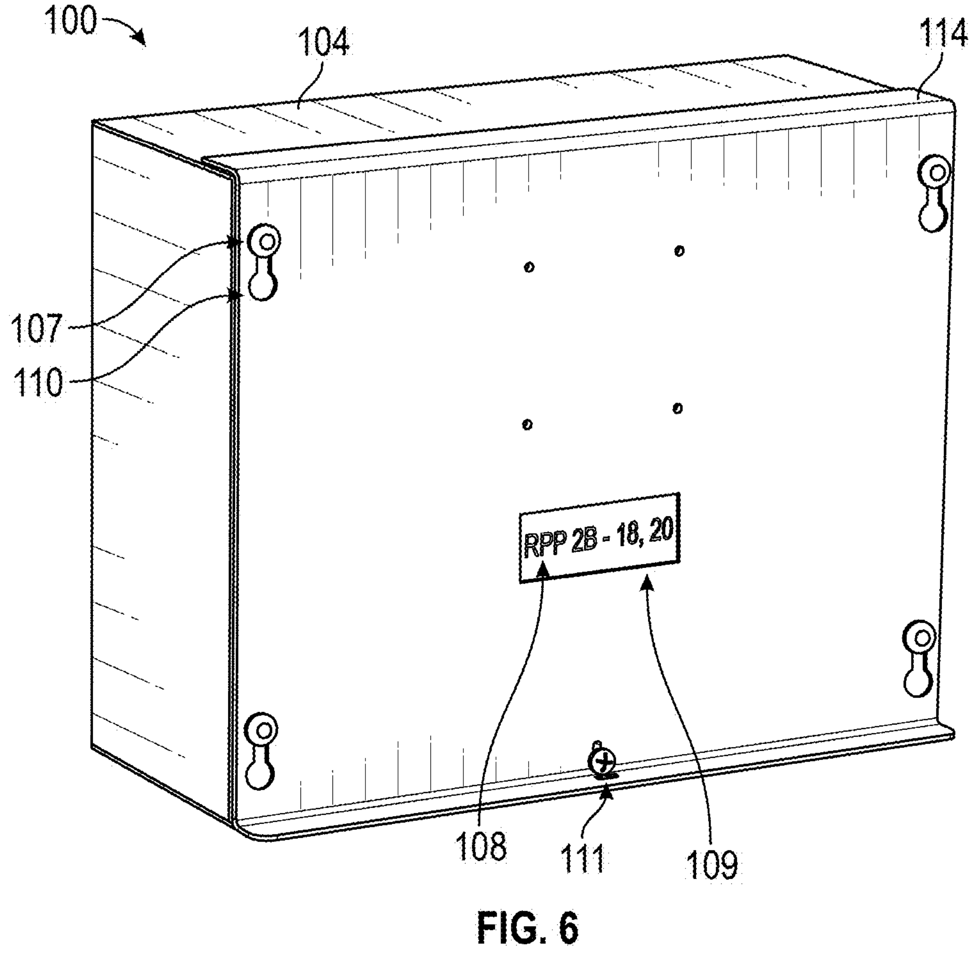
FIG. 6 is a front isometric view of an alternative embodiment of a modular power box with a blank cover plate configured for no output receptacles or associated circuit breakers, mechanically attached to a base box.

Once the plurality of PIM mounting zones 110 have been successfully mechanically engaged with the plurality of PIM mounting components 107 of the base box 104, the PIM 101 can be further secured to the base box 104 through the use of an additional mounting component 111. This mounting component 111 can connect the PIM 101 at its mounting component slot 112 to the mounting component connector 113 on the base box 104. The mounting component slot 112 in some embodiments can be an offset slot such that the mounting component 111 must be at least partially disengaged from the base box 104 before the PIM 101 can be removed. In some embodiments, the mounting component 111 and mounting component slot 112 can act as failsafe mechanisms to ensure the electrical connectors component 105 of the PIM 101 and electrical connectors component 106 of the base box 104 remain electrically connected even if the plurality of PIM mounting components 107 are not as secured as required or desired. FIG. 1B shows a semi-transparent view showing the mounting component 111 partially installed to a base box 104, and a mounting component slot 112. The mounting component 111 as shown here has been backed off sufficiently from the base box 104 such that the PIM 101 can be removed by passing the mounting component 111 through the mounting component slot 112 present on the PIM 101. The embodiment of the mounting component 111 in FIGS. 1, 5, and 6 is a screw with a head wider than shaft. Other embodiments of mounting components 111 can be wedges, keys, or other forms of interlocking known by one skilled in the art, as desired or required.

The PIM 101 can be configured to meet a variety of power specifications depending on the demand at the specified base box 104. As non-limiting examples, the PIM 101 could be configured to provide 20, 30, 40, 50, or 60 Amp power in either single phase or three phase configurations to a singular output receptacle 102 or a multitude of output receptacles 102, and operate at either 208 Volts or 415 Volts or a different voltage. These configurations of the PIM 101 do not substantially change the overall design and utility of the modular power box 100 as a whole.

Figure 3:
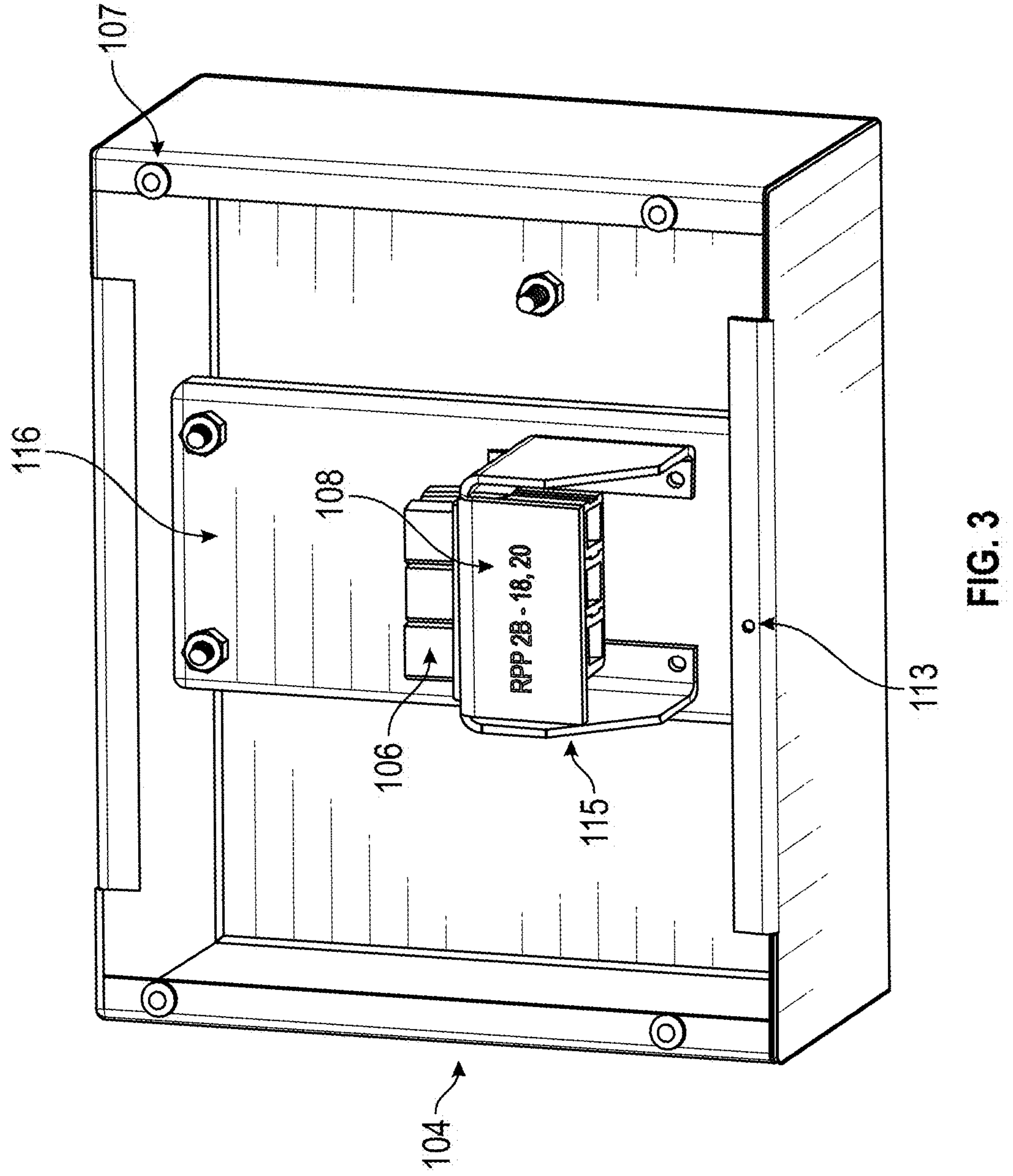
FIG. 3 is a front isometric view of an embodiment of a base box according to current disclosures. (Note: electrical wiring is not shown for clarity.)

FIG. 3 is a front isometric view of the base box 104 of FIG. 1A. The base box 104 can be a five-sided enclosure which houses an electrical connectors component 106 mechanically attached to the base box's 104 backplane 116. The base box 104 need not be five-sided; rather, the base box 104 can comprise more or fewer sides, as desired or required. In some embodiments, the electrical connectors component 106 is connected to the base box 104 using electrical connector support brackets 115 and a backplane 116. The electrical connectors component 106 can be connected to the base box 104 by various other means known by one skilled in the art (i.e., gluing, welding, sintering, tying, etc.), as desired or required. The base box 104 can be permanently attached to a branch circuit 200 (i.e., the electrical branch circuiting infrastructure) electrically connected to the RPP 201. The electrical connectors component 106 itself can be configured to have on its front face a circuit ID label 108 or tag positioned in such a way that when a PIM 101 or blank cover plate 114 is fully installed, the circuit ID label 108 is visible through the circuit ID tag window or opening 109 of the PIM 101 or blank cover plate 114. In some embodiments, the base box 104 further comprises a plurality of PIM mounting components 107 which can mechanically engage with the plurality of PIM mounting zones 110 on the PIM 101 or a blank cover plate 114 when installation is complete. The configuration of the plurality of PIM mounting zones 110 can be such that it would accommodate both PIMs 101 and blank cover plates 114 without needing modification. In the embodiment illustrated in FIG. 3, the plurality of PIM mounting components 107 are screws with a head wider than their shaft, and the plurality of cover mounting zones 110 (not shown in FIG. 3) are keyed slots which have a slot with zones that can accommodate the head of the PIM mounting component 107, such that when there is complete electrical connection between the electrical connectors component 106 of the base box 104 and the associated electrical connectors component 105 of the PIM 101 (shown in FIG. 2), the plurality of PIM mounting components 107 are engaged with the plurality of PIM mounting zones 110. In some embodiments, the base box 104 also has a mounting component connector 113 which can receive a mounting component 111 when securely fastening the PIM 101 or a blank cover plate 114 to the base box 104.

Figure 4A:
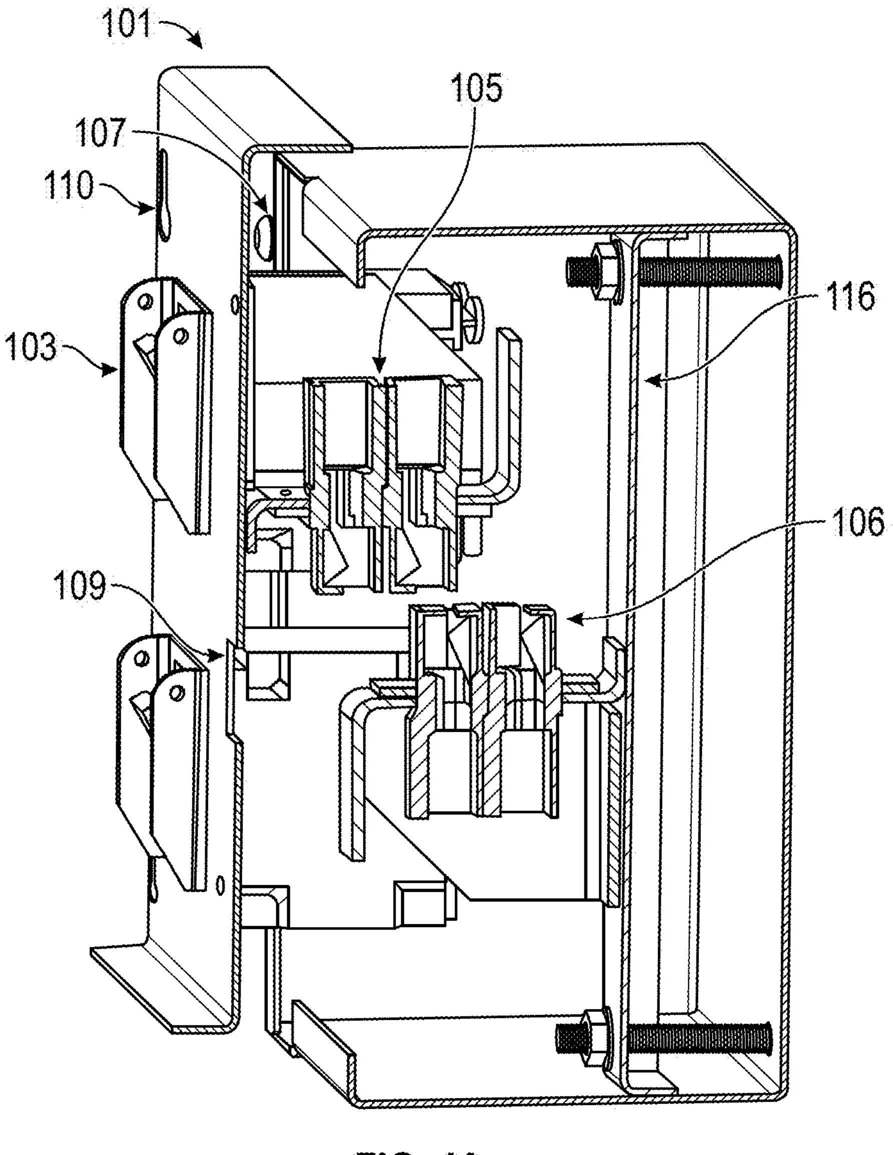
FIG. 4A shows a bisected isometric view of a PIM and a base box during installation prior to the PIM horizontally seating flush to the base box and prior to the PIM electrical connectors vertically engaging
Figure 4B:
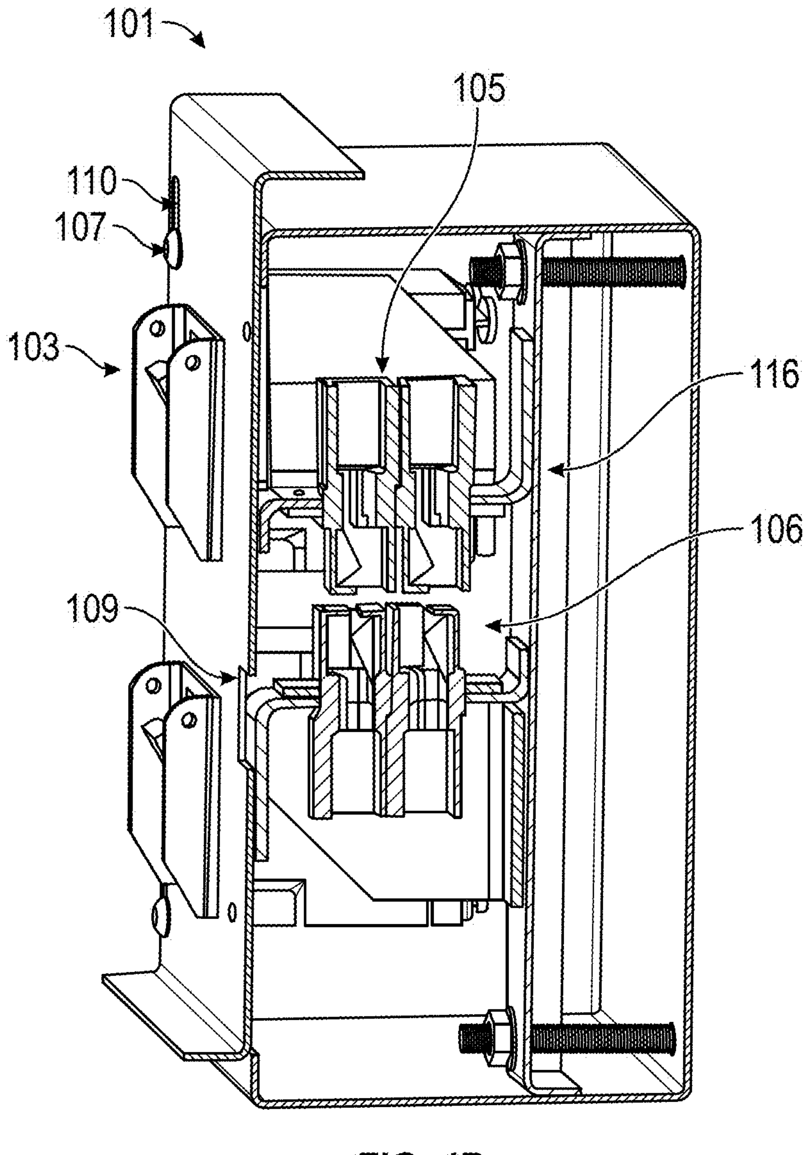
FIG. 4B shows a bisected isometric view of a PIM and a base box during installation after the PIM has been seated flush to the base box and prior to the PIM electrical connectors vertically engaging.
Figure 4C:
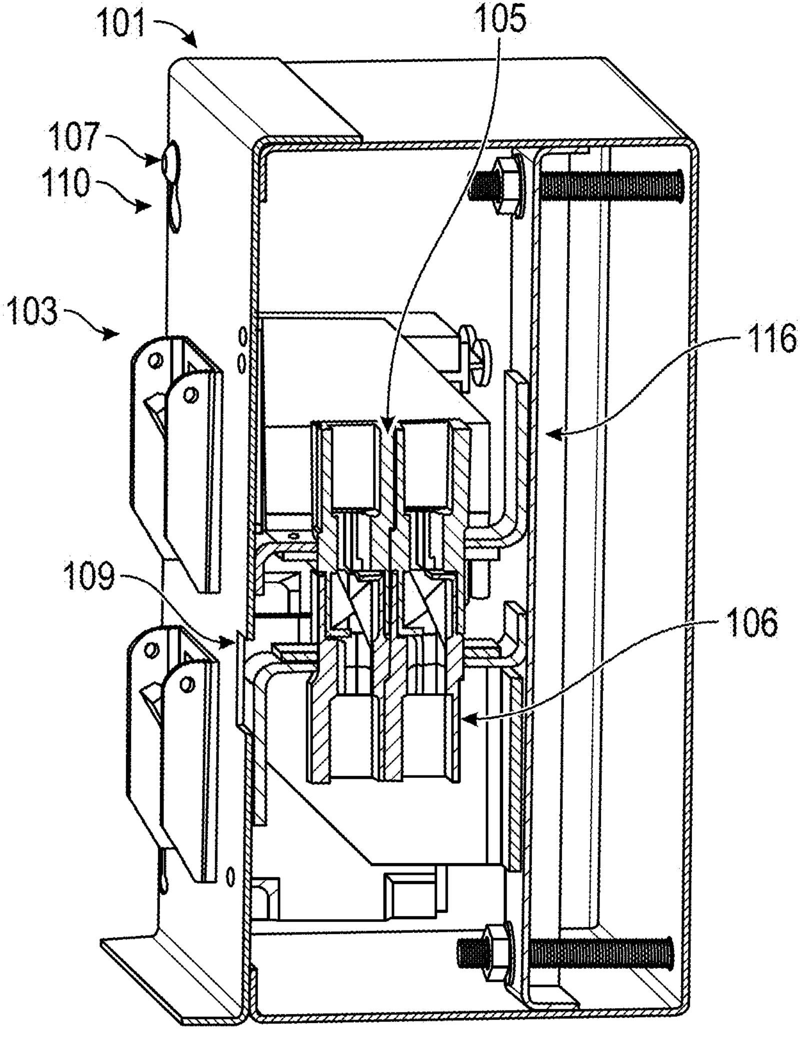
FIG. 4C shows a bisected isometric view of a PIM and a base box upon completion of the PIM's installation where the PIM is seated flush with the base box and the PIM electrical connectors are fully engaged.

FIGS. 4A-4C demonstrate one possible valid method of installing a PIM 101 onto a base box 104. FIGS. 4A-4C show a vertically bisected isometric view of the installation process. The embodiment of the plurality of PIM mounting components 107 and the plurality of PIM mounting zones 110 in FIGS. 4A through 4C are screws with a head wider than their shaft and keyed slots which have a slot with zones that can accommodate the head of the PIM mounting component 107. The base box 104 in these figures has already been mounted by attaching the external back surface of the base box 104 to a structural member, by using some form of mounting hardware (e.g., screws which engage threaded holes in the base box 104, nuts and bolts, etc.) not depicted in the figures. In other embodiments of the modular power box 100, the base box 104 can be mounted using other surfaces.

In FIG. 4A, the PIM 101 is aligned with the base box 104 so that the portion of the plurality of PIM mounting zones 110 which are sized to accommodate the heads of the plurality of PIM mounting components 107 of the base box 104 are aligned with the plurality of PIM mounting components 107.

In FIG. 4B, the PIM 101 is moved toward the base box 104 such that the back face of the PIM 101 touches the front mounting surface of the base box 104. The plurality of PIM mounting zones 110 are positioned such that the heads of the plurality of PIM mounting components 107 pass through the plurality of PIM mounting zones 110. At this step, the associated electrical connectors component 105 and the electrical connectors component 106 of the base box have not yet formed an electrical connection.

In the illustrated embodiment depicted in FIG. 4C, the PIM 101 is moved down vertically relative to the base box 104 such that the plurality of PIM mounting zones 110 and plurality of PIM mounting components 107 of the base box mechanically engage. In other embodiments, the base box 104 could be configured or positioned such that disengaging a PIM 101 or blank cover plate 114 from a base box 104 would require moving the PIM 101 or blank cover plate 114 in the opposite direction relative to the base box 104. In the embodiment illustrated in FIG. 4C, this means the plurality of PIM mounting components 107 are now positioned in such a way that their heads are engaged with the narrower portion of the plurality of PIM mounting zones 110. Simultaneously, the electrical connectors component 106 of the base box and the associated electrical connectors component 105 of the PIM 101 form an electrical connection. At this step, the circuit ID label 108 can be visible through the circuit ID opening 109 of the PIM 101 or blank cover plate 114. In some embodiments, the mounting component 111 further connecting the PIM 101 or blank cover plate 114 to the base box 104 could be installed to connect the mounting component slot 112 of the PIM 101 to the mounting component connector 113 of the base box 104 (shown in FIGS. 1, 2, and 3). The embodiment of the mounting component 111 depicted in FIG. 1A is a threaded screw, which engages with the threads within this embodiment of the mounting component connector 113 and passes through the mounting component slot 112 of the PIM 101.

An installed PIM 101 for a modular power box 100 can be replaced with a chosen PIM, either an identically configured PIM 101 or an alternative PIM 101 or a blank cover plate 114 by following the steps laid out in FIG. 4A-C. This could be beneficial if the PIM 101 is damaged somehow, if the power usage requirements have been determined, if power usage requirements have changed since the time the previous PIM 101 was installed, for diagnostic purposes, or for other purposes understood by one skilled in the art. Starting with FIG. 4C, the first PIM 101 or blank cover plate 114 can be removed or detached by disengaging the mounting component 111 from the mounting component slot 112 and mounting component connector 113, if such mounting component 111 was installed. In the embodiment depicted in FIGS. 1 through 3, the mounting component 111 is a threaded screw, so removal of the mounting component 111 from the mounting component slot 112 and mounting component connector 113 would require substantial unthreading of mounting component 111 from the mounting component connector 113. Upon sufficiently disengaging the mounting component 111, the blank cover plate 114 can be removed by lifting the PIM 101 to disengage the electrical connectors component 106 of the base box 104 from the associated electrical connectors component 105 of the PIM 101, and partially disengage the plurality of PIM mounting components 107 from the plurality of PIM mounting zones 110. Then, following the steps of FIG. 4B, the first PIM 101 or blank cover plate 114 should be positioned such that the plurality of PIM mounting components 107 align with the plurality of PIM mounting zones 110 in such a way that the first PIM 101 or blank cover plate 114 can be removed. In the embodiments depicted in FIG. 4B, this means that the heads of the plurality of PIM mounting components 107 should be aligned with the portions of the plurality of PIM mounting zones 110 which are sized to accommodate the heads of the plurality of PIM mounting components 107. Finally, in FIG. 4A, once the first PIM 101 or blank cover plate 114 is removed, the chosen power interface module or blank cover plate either an identical PIM or an alternative PIM 101 or a blank cover plate 114 can be installed following the steps laid out in FIG. 4A-C in order of 4A, 4B, then 4C.

FIG. 5 demonstrates an alternative embodiment of a PIM 101. FIG. 5 illustrates another embodiment of a PIM 101 that is configured with a singular output receptacle 102 and, as such, a singular circuit breaker 103. This alternative PIM 101 can be configured to interface with the same base box 104 as the PIM 101 disclosed herein, having the same positioning for its plurality of PIM mounting zones 110 and its associated electrical connectors component 105. This modularity advantageously allows the base box 104 to be installed in a generic manner and then configured later down the line once the specific power output requirements of the modular power box 100 is determined. As described herein, the PIM 101 can be attached to the base box 104 by passing the plurality of PIM mounting components 107 through the plurality of PIM mounting zones 110 of the base box 104. As described herein, the PIM 101 can be attached to the base box 104 through the use of a mounting component 111 connecting the mounting component slot 112 of the PIM 101 and the mounting component connector 113 of the base box 104.

FIG. 6 illustrates an alternative embodiment of the modular power box 100 where a blank cover plate 114 is installed instead of a PIM 101. The blank cover plate 114 is a flat metal mounting surface with upper and lower protrusions or lips for mounting and de-mounting from the base box 104, configured for no output receptacles or associated circuit breakers. The blank cover plate 114 can interface with the same base box 104 as a PIM 101, having compatible plurality of PIM mounting components 107, mounting component slot 112, and any other features which are required for compatibility of the blank cover plate 114 with the base box 104. When the blank cover plate 114 is fully installed, the circuit ID label 108 of the base box 104 is visible through the circuit ID tag window or opening 109 of the PIM 101 or blank cover plate 114. The blank cover plate 114 can be installed in a substantially similar method as a PIM 101 and can be used as a protective cover plate to prevent the exposure of live wires when a modular power box 100 is not yet configured for a desired power output or is otherwise not currently in use. As described herein, the blank cover plate 114 can be attached to the base box 104 by passing the plurality of PIM mounting components 107 through the plurality of mounting zones 110 of the base box 104. As described herein, the blank cover plate 114 can be attached to the base box 104 through the use of a mounting component 111 connecting the mounting component slot 112 of the blank cover plate 114 and the mounting component connector 113 of the base box 104. In some variants, the plate of the blank cover plate 114 is slightly angled relative to mounting surface on the modular power box 100 once installed. Angling the plate of a PIM 101 or blank cover plate 114 relative to the mounting surface of a base box 104 can relieve pressure from an electrical connector support bracket 115, the plurality of PIM mounting components 107, and the mounting component connector 113.

Figure 7:
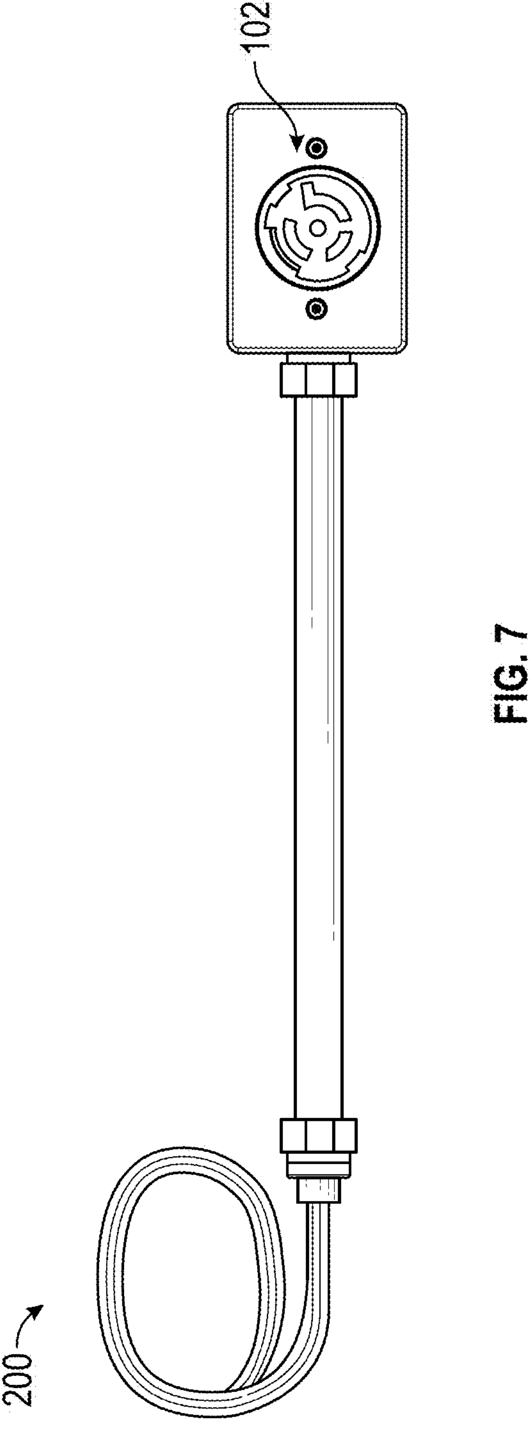
FIG. 7 is an example of a traditional branch circuit system used for power distribution.
Figure 8:
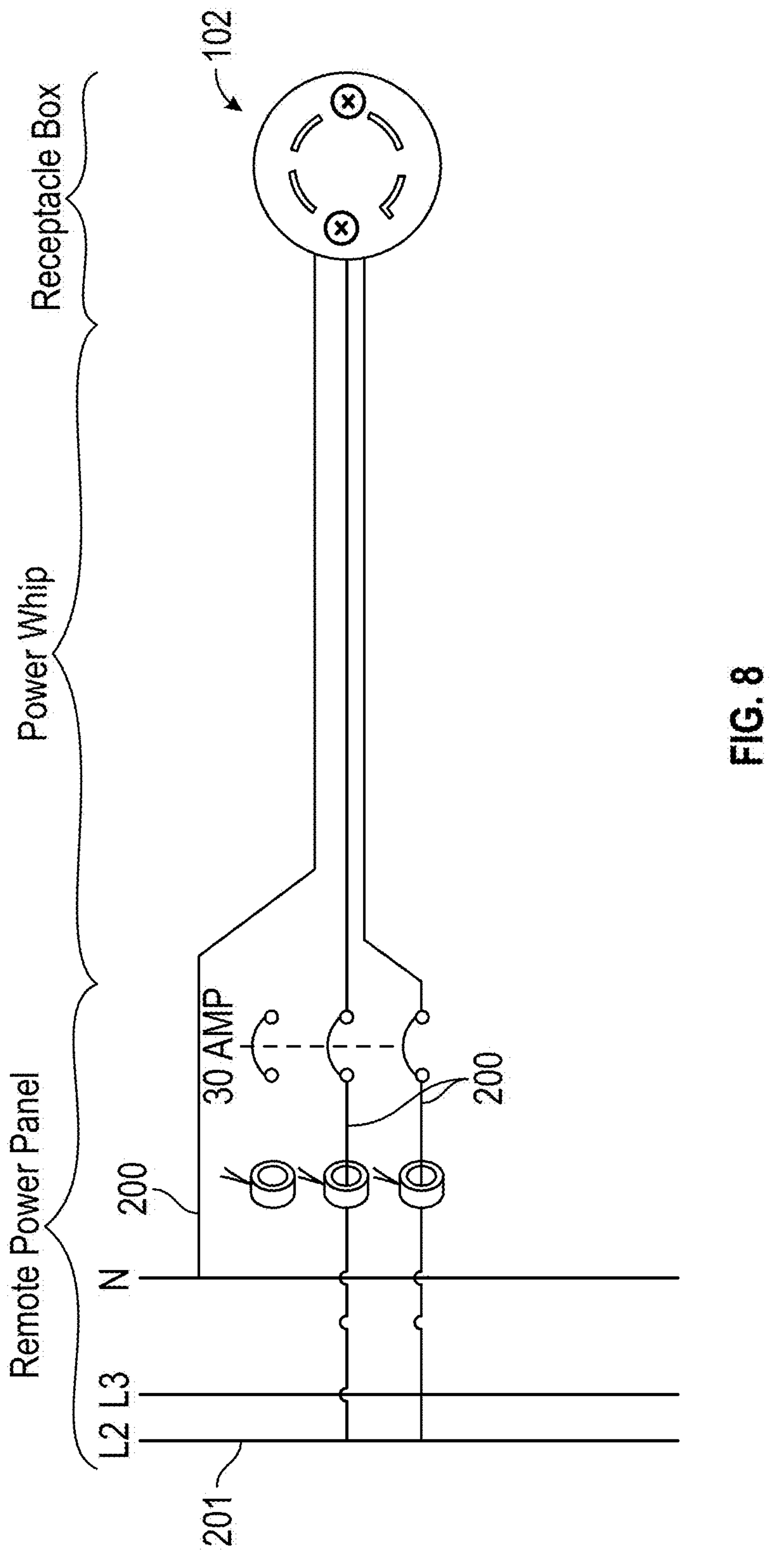
FIG. 8 is an electrical diagram for the traditional branch circuit system from FIG. 7.

FIG. 7 depicts a typical branch circuit 200 and receptacle 102 that can be used for power distribution for ITE, FIG. 8 is an electrical diagram of the branch circuit 200 depicted in FIG. 7 connected to an RPP 201. The electrical connection to the RPP 201 provides the power to the output receptacles 102 as configured on the RPP end of the circuit through branch circuit 200 wiring. This method requires that the power requirements for the output receptacle 102 are known at the time of installation and cannot easily be modified in comparison to how easily the modular power box 100 disclosed herein can be modified.

Figure 9:
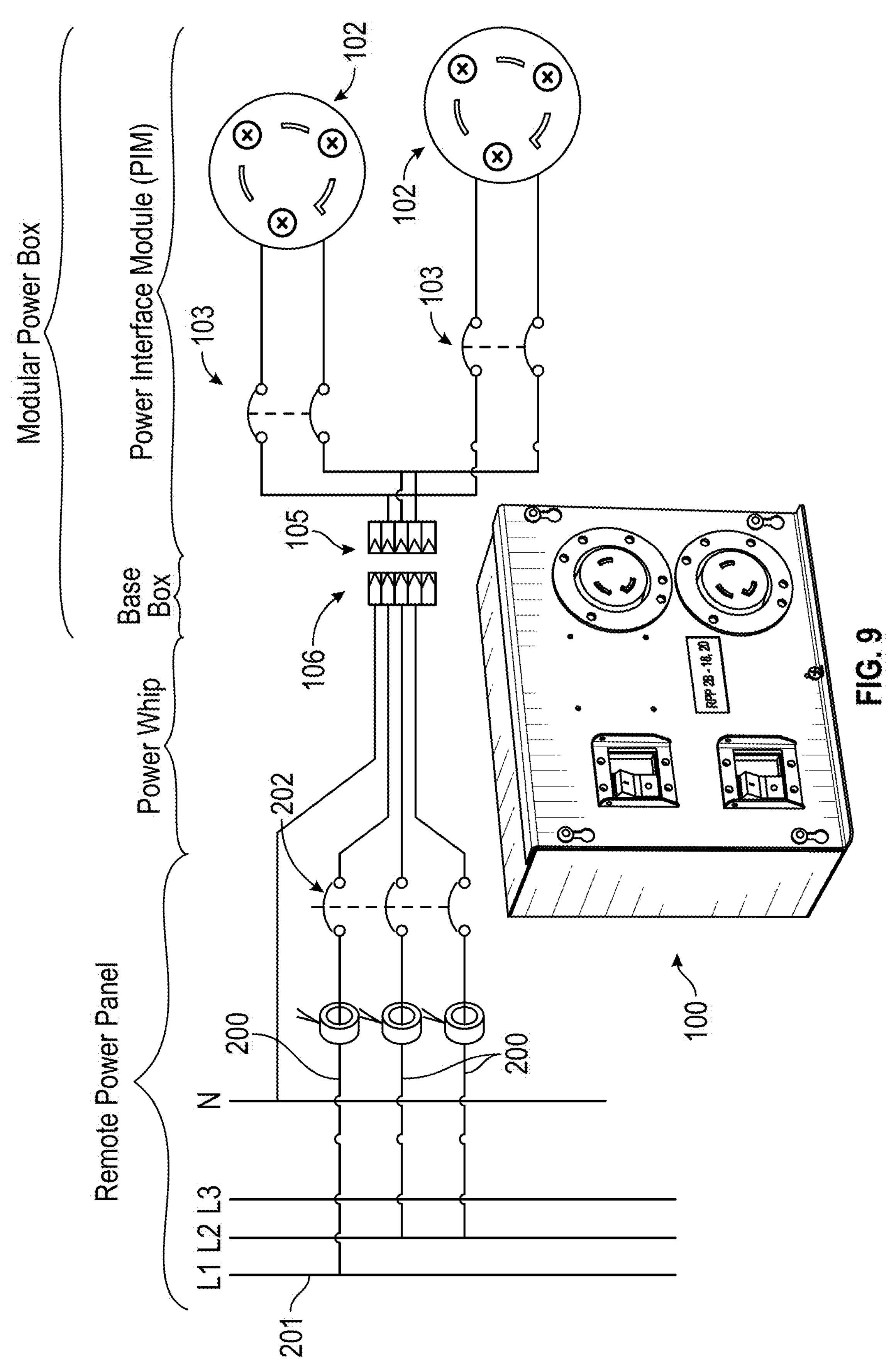
FIG. 9 is an electrical diagram for the embodiment of a base box and PIM for the disclosed modular power box from FIG. 1.

FIG. 9 is an electrical diagram for the base box 104 and one embodiment of the PIM 101 for a modular power box 100. The electrical connection to the RPP 201 leads to a branch circuit 200 (which in some embodiments can be protected by a branch circuit breaker 202) which connects to electrical connectors component 106 on the base box 104. The branch circuit 200 can be further protected by a branch circuit breaker. The associated electrical connectors component 105 of the PIM 101 is then electrically connected to the output receptacles 102 by way of the circuit breakers 103. The embodiment depicted in FIG. 9 is configured to distribute single phase 30 Amp power to the two output receptacles 102 for the PIM 101.

Figure 10:
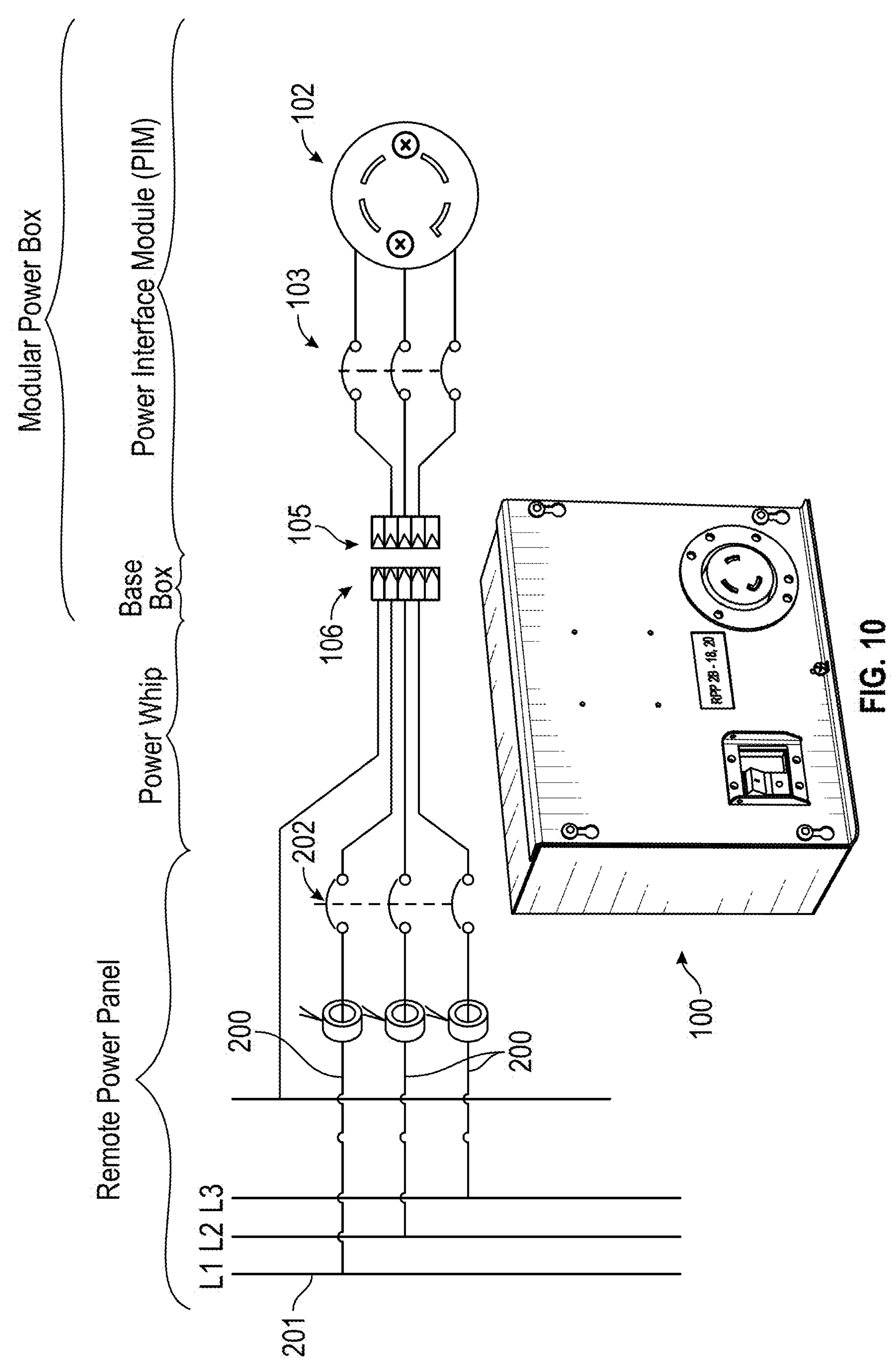
FIG. 10 is an electrical diagram for the alternative embodiment of a base box and PIM for the disclosed modular power box FIG. 5.

FIG. 10 is an electrical diagram for the base box and an alternative embodiment of the PIM 101 for the disclosed modular power box 100. The electrical connection to the RPP 201 leads to a branch circuit 200 (which in some embodiments can be protected by a branch circuit breaker 202) which connects to electrical connectors component 106 of the base box 104. The branch circuit 200 can be further protected by a branch circuit breaker. The associated electrical connectors component 105 of the alternative PIM 101 is then electrically connected to the output receptacle 102 by way of the circuit breaker 103. The embodiment depicted in FIG. 10 is configured to distribute 3 phase 30 Amp power to the singular output receptacle 102 for the alternative PIM 101.

Methods

The methods which are described and illustrated herein are not limited to the sequence of acts described, nor are they necessarily limited to the practice of all of the acts set forth. Other sequences of acts, or less than all of the acts, or simultaneous occurrence of the acts, may be utilized in practicing embodiments of the invention(s).

Ranges

It is to be understood that any range of values disclosed, taught, or suggested herein comprises all values and sub-ranges therebetween. For example, a range from 5 to 10 will comprise all numerical values between 5 and 10 and all sub-ranges between 5 and 10.

CONCLUSION

From the foregoing description, it will be appreciated that a novel approach for the installation of more modular power boxes has been disclosed. While the components, techniques, and aspects of embodiments of the invention have been described with a certain degree of particularity, it is manifest that many changes may be made in the specific designs, constructions, and methodology herein above described without departing from the spirit and scope of this disclosure.

While a number of preferred embodiments of the invention and variations thereof have been described in detail, other modifications and methods of using and power delivery applications for the same will be apparent to those of skill in the art. Accordingly, it should be understood that various applications, modifications, and substitutions may be made of equivalents without departing from the spirit of embodiments of the invention or the scope of the claims.

Various modifications and applications of the embodiments of the invention may occur to those who are skilled in the art, without departing from the true spirit or scope of the embodiments of the invention. It should be understood that the invention(s) is not limited to the embodiments set forth herein for purposes of exemplification but is to be defined only by a fair reading of the appended claims, including the full range of equivalency to which each element thereof is entitled.

What is claimed is:

1. A modular power box kit, the kit comprising:

a base box comprising:

an enclosure with a box mounting surface and an opening;

a box electrical connector configured to receive power from a power source; and a plurality of box mounting components; and a first interface module and a second interface module, wherein each interface module comprises:

an interface module mounting surface configured to interface with the box mounting surface;

an interface module electrical connector configured to align with the box electrical connector in a direction other than perpendicular to the box mounting surface when either the first interface module or the second interface module is assembled with the base box; and a plurality of interface module mounting holes configured to align with the plurality of box mounting components when either the first interface module or the second interface module is assembled with the base box;

wherein:

the first interface module and/or the second interface module further comprises at least one receptacle configured to receive the power through the interface module electrical connector; and a chosen interface module is either the first interface module or the second interface module;

wherein:

the modular power box kit is assembled by engaging the plurality of box mounting components with the plurality of interface module mounting holes on the chosen interface module; and an electrical connection is formed between the box electrical connector and the interface module electrical connector of the chosen interface module when the chosen interface module is assembled with the base box for the power source to supply the power to the chosen interface module.

2. The modular power box kit of claim 1, wherein:

the first interface module is configured to provide 3 phase 60 Amp power to the at least one receptacle on the first interface module.

3. The modular power box kit of claim 1, wherein:

the first interface module further comprises a circuit breaker;

when the circuit breaker is in a first position, the at least one receptacle of the first interface module is in electrical communication with the power source; and when the circuit breaker is in a second position, the at least one receptacle of the first interface module is not in electrical communication with the power source.

4. The modular power box kit of claim 1, wherein the chosen interface module is the second interface module; and wherein the second interface module is configured to provide single phase 30 Amp power to two of the at least one receptacle on the second interface module.

5. The modular power box kit of claim 1, wherein:
the chosen interface module further comprises an interface module opening;
the base box further comprises an ID label; and
the ID label is visible through the interface module opening when the chosen interface module is connected to the base box.

6. The modular power box kit of claim 1, wherein, after the chosen interface module is assembled with the base box, the chosen interface module substantially contains arc flashes between the interface module electrical connector of the chosen interface module and the box electrical connector to within the base box and the chosen interface module.

7. The modular power box kit of claim 1, wherein the plurality of interface module mounting holes on each of the first interface module and the second interface module are keyed such that each of the first interface module and the second interface module is prevented from being able to pivot away from the base box when the plurality of box mounting components engage with the plurality of interface module mounting holes.

8. The modular power box kit of claim 1, wherein the interface module electrical connector of the chosen interface module and the box electrical connector are configured to prevent accidental contact with personnel or unintended components before the electrical connection is made.

9. A modular power box kit, the kit comprising:
a base box comprising:
an enclosure with a box mounting surface and an opening;
a box electrical connector configured to receive power from a power source; and
a plurality of box mounting components; and
a first interface module and a second interface module, wherein each interface module comprises:
an interface module mounting surface configured to interface with the box mounting surface;
an interface module electrical connector configured to align with the box electrical connector in a direction that is parallel to the box mounting surface, and the interface module electrical connector and the box electrical connector align at a location within the base box when either the first interface module or the second interface module is assembled with the base box; and
a plurality of interface module mounting holes configured to align with the plurality of box mounting components when either the first interface module or the second interface module is assembled with the base box;
wherein:
the first interface module and/or the second interface module further comprises at least one receptacle configured to receive the power through the interface module electrical connector; and
a chosen interface module is either the first interface module or the second interface module;
wherein:
the modular power box kit is assembled by engaging the plurality of box mounting components with the plurality of interface module mounting holes on the chosen interface module; and
an electrical connection is formed between the box electrical connector and the interface module electrical connector of the chosen interface module when the chosen interface module is assembled with the base box for the power source to supply the power to the chosen interface module.

10. The modular power box kit of claim 9, wherein:
the chosen interface module further comprises an interface module opening;
the base box further comprises an ID label; and
the ID label is visible through the interface module opening when the chosen interface module is connected to the base box.

11. The modular power box kit of claim 9, wherein the plurality of interface module mounting holes on each of the first interface module and the second interface module are keyed such that each of the first interface module and the second interface module is prevented from being able to pivot away from the base box when the plurality of box mounting components engage with the plurality of interface module mounting holes.

12. The modular power box kit of claim 9, wherein the interface module electrical connector of the chosen interface module and the box electrical connector are configured to prevent accidental contact with personnel or unintended components before the electrical connection is made.

13. A modular power box kit, the kit comprising:
a base box comprising:
an enclosure with a box mounting surface and an opening;
a box electrical connector configured to receive power from a power source; and
a plurality of box mounting components; and
a plurality of interface modules, wherein each of the interface modules comprises:
an interface module mounting surface configured to interface with the box mounting surface;
an interface module electrical connector configured to align with the box electrical connector in a direction other than perpendicular to the box mounting surface when at least one interface module of the plurality of interface modules is assembled with the base box; and
a plurality of interface module mounting holes configured to align with the plurality of box mounting components when at least one interface module of the plurality of interface modules is assembled with the base box;
wherein:
a first interface module of the plurality of interface modules comprises a first number of a receptacle or receptacles;
a second interface module of the plurality of interface modules comprises a second number of the receptacle or receptacles; and
a total number of the receptacle or receptacles of the first interface module is different than a total number of the receptacle or receptacles of the second interface module;
wherein the modular power box kit is configured to be assembled by engaging the plurality of box mounting components with the plurality of interface module mounting holes on a chosen interface module of the plurality of interface modules.

14. The modular power box kit of claim 13, wherein the direction in which the interface module electrical connector is configured to align with the box electrical connector is parallel to the box mounting surface and the interface module electrical connector and the box electrical connector align at a location within the base box.

15. The modular power box kit of claim 13, wherein:

the first interface module further comprises at least one circuit breaker and is the chosen interface module;

when the first interface module is assembled with the base box and when a chosen circuit breaker of the at least one circuit breaker is in a first position, an associated receptacle of the first number of the receptacle or receptacles on the first interface module is in electrical communication with the power source through the box electrical connector, the interface module electrical connector and the at least one circuit breaker; and when the at least one circuit breaker of the at least one circuit breaker is in a second position, the associated receptacle of the first number of the receptacle or receptacles on the first interface module is not in electrical communication with the power source.

16. The modular power box kit of claim 13, wherein the first interface module comprises at least one receptacle of the first number of the receptacle or receptacles and is configured to provide 3 phase 60 Amp power to the at least one receptacle.

17. The modular power box kit of claim 13, wherein the first interface module comprises at least two receptacles of the first number of the receptacle or receptacles, wherein the first interface module is configured to provide single phase 30 Amp power to the at least two receptacles.

18. The modular power box kit of claim 13, wherein at least one of the plurality of interface modules further comprises an opening and the base box further comprises an ID label, wherein the ID label is visible through the opening of the at least one of the plurality of interface modules when the at least one of the plurality of interface modules is assembled with to the base box.

19. The modular power box kit of claim 13, wherein, after the chosen interface module is assembled with the base box, the chosen interface module substantially contains arc flashes between the interface module electrical connector of the chosen interface module and the box electrical connector to within the base box and the chosen interface module.

20. The modular power box kit of claim 13, wherein the plurality of interface module mounting holes are keyed such that each of the interface modules is prevented from being able to pivot away from the base box when the plurality of box mounting components engage with the plurality of interface module mounting holes.

21. A modular power box comprising:

a base box comprising:
- an enclosure with a box mounting surface and an opening;
- a box electrical connector configured to receive power from a power source; and
- a plurality of box mounting components; and a cover plate configured to connect with the base box, wherein the cover plate comprises:
- a cover plate mounting surface configured to interface with the box mounting surface; and
- a cover plate electrical connector configured to align with the box electrical connector in a direction other than perpendicular to the box mounting surface when the cover plate is assembled with the base box; and
- a plurality of cover plate mounting holes configured to align with the plurality of box mounting components when the cover plate is assembled with the base box;

wherein the cover plate is configured to be assembled with the base box by engaging the plurality of box mounting components with the plurality of cover plate mounting holes.

22. The modular power box of claim 21, wherein the direction in which the cover plate electrical connector is configured to align with the box electrical connector is parallel to the box mounting surface and the cover plate electrical connector and the box electrical connector align at a location within the base box.

23. The modular power box of claim 21, wherein:

the cover plate further comprises at least one receptacle; and the modular power box is configured such that, when the plurality of box mounting components engage with the plurality of cover plate mounting holes, an electrical connection is formed between the power source and the at least one receptacle of the cover plate through the box electrical connector and the cover plate electrical connector.

24. The modular power box of claim 23, wherein;

the cover plate further comprises at least one circuit breaker;

the at least one circuit breaker is configured to electrically connect the power source and the at least one receptacle of the cover plate when active; and the at least one circuit breaker is configured to electrically separate the power source and the at least one receptacle of the cover plate when inactive.

25. The modular power box of claim 23, wherein the at least one receptacle of the cover plate is a single receptacle and the cover plate is configured to provide 3 phase 60 Amp power to the single receptacle.

26. The modular power box of claim 23, wherein the at least one receptacle of the cover plate comprises at least two receptacles, and wherein the cover plate is configured to provide single phase 30 Amp power to the at least two receptacles.

27. The modular power box of claim 23, wherein:

the cover plate further comprises a cover plate opening;

the base box further comprises a circuit ID label; and the circuit ID label is visible through the cover plate opening when the cover plate is assembled with the base box.

28. The modular power box of claim 23, wherein, after the cover plate is assembled with the base box, the cover plate substantially contains arc flashes between the cover plate electrical connectors and the box electrical connector to within the modular power box.

29. The modular power box of claim 21, wherein the cover plate comprises a first cover plate and a second cover plate each having the cover plate mounting surface, the cover plate electrical connector and the plurality of cover plate mounting holes, wherein: the second cover plate has a different number of circuit breakers and/or a different number of receptacles than the first cover plate.

30. The modular power box of claim 21, wherein the plurality of cover plate mounting holes are keyed such that the cover plate is prevented from being able to pivot away from the base box when the plurality of box mounting components engage with the plurality of cover plate mounting holes.

31. A modular power box kit, the kit comprising:

a base box comprising:
- an enclosure with a box mounting surface and an opening;
- a box electrical connector configured to receive power from a power source; and
- a plurality of box mounting components; and a first interface module and a second interface module, wherein each interface module comprises:

an interface module mounting surface configured to interface with the box mounting surface;

an interface module electrical connector configured to align with the box electrical connector when either the first interface module or the second interface module is assembled with the base box; and a plurality of interface module mounting holes configured to align with the plurality of box mounting components when either the first interface module or the second interface module is assembled with the base box;

wherein:

the first interface module and/or the second interface module further comprises at least one receptacle configured to provide the power through the interface module electrical connector, and a chosen interface module is either the first interface module or the second interface module;

wherein:

as the chosen interface module is assembled with the base box, a mechanical connection is formed between the plurality of box mounting components and the plurality of interface module mounting holes on the chosen interface module, and an electrical connection is formed between the box electrical connector and the interface module electrical connector of the chosen interface module for the power source to supply the power to the chosen interface module; and the modular power box kit is configured so that the interface module mounting surface of the chosen interface module contacts the box mounting surface before the electrical connection is formed.

32. The modular power box kit of claim 31, wherein:

the chosen interface module further comprises an interface module opening;

the base box further comprises an ID label; and the ID label is visible through the interface module opening when the chosen interface module is assembled with the base box.

33. The modular power box kit of claim 31, wherein the plurality of interface module mounting holes on each of the interface modules are keyed such that each of the interface modules is prevented from being able to pivot away from the base box when the chosen interface module is assembled with the base box.

34. A modular power box kit, the kit comprising:

a base box comprising:

an enclosure with a box mounting surface;

a box electrical connector configured to receive power from a power source; and a plurality of box mounting components; and a plurality of interface modules, wherein each of the interface modules comprises:

an interface module mounting surface configured to interface with the box mounting surface;

an interface module electrical connector configured to engage with the box electrical connector to form an electrical connection between the power source and the interface module connector to supply the power to the chosen interface module through the box electrical connector when a chosen interface module of the plurality of interface modules is assembled with the base box;

a plurality of interface module mounting holes configured to align with the plurality of box mounting components when the chosen interface module is assembled with the base box;

wherein:

a first interface module of the plurality of interface modules comprises a first number of a receptacle or receptacles;

a second interface module of the plurality of interface modules comprises a second number of the receptacle or receptacles; and a total number of the receptacle or receptacles of the first interface module is different than a total number of the receptacle or receptacles of the second interface module;

wherein:

the modular power box kit is configured to be assembled by forming a mechanical connection between the base box and the chosen interface module when the plurality of box mounting components engage with the plurality of interface module mounting holes on the chosen interface module; and the modular power box kit is configured so that the interface module mounting surface of the chosen interface module contacts the box mounting surface before the electrical connection is formed.

35. The modular power box kit of claim 34, wherein the chosen interface module further comprises an interface module opening and the base box further comprises an ID label, wherein the ID label is visible through the interface module opening when the chosen interface module is assembled with the base box.

36. A modular power box comprising:

a base box comprising:

an enclosure with a box mounting surface;

a box electrical connector configured to receive power from a power source; and a plurality of box mounting components; and a cover plate configured to connect with the base box, wherein the cover plate comprises:

a cover plate mounting surface configured to interface with the box mounting surface; and a cover plate electrical connector configured to align with the box electrical connector when the cover plate is assembled with the base box; and a plurality of cover plate mounting holes configured to align with the plurality of box mounting components when the cover plate is assembled with the base box;

wherein:

as the cover plate is assembled with the base box by a mechanical connection formed between the plurality of box mounting components and the plurality of cover plate mounting holes, an electrical connection is formed between the box electrical connector and the cover plate electrical connector to provide the power from the power source to the cover plate; and the modular power box is configured so that the cover plate mounting surface of the cover plate contacts the box mounting surface before the electrical connection is formed.

37. The modular power box of claim 36, wherein the cover plate comprises a first cover plate and a second cover plate each having the cover plate mounting surface, the cover plate electrical connector, the plurality of cover plate mounting holes, and a receptacle or receptacles, wherein the first cover plate has a first number of the receptacle or receptacles and the second cover plate has a second number of the receptacle or receptacles different than the first number of the receptacle or receptacles.

* * * * *